March 29, 1960

E. HABERKORN 2,930,551

LANDING DEVICE PARTICULARLY INTENDED FOR AIRCRAFT
WHICH TAKE-OFF AND LAND VERTICALLY

Filed Sept. 18, 1956

INVENTOR
ERICH HABERKORN

By

Watson, Cole, Grindle & Watson
ATTORNEYS

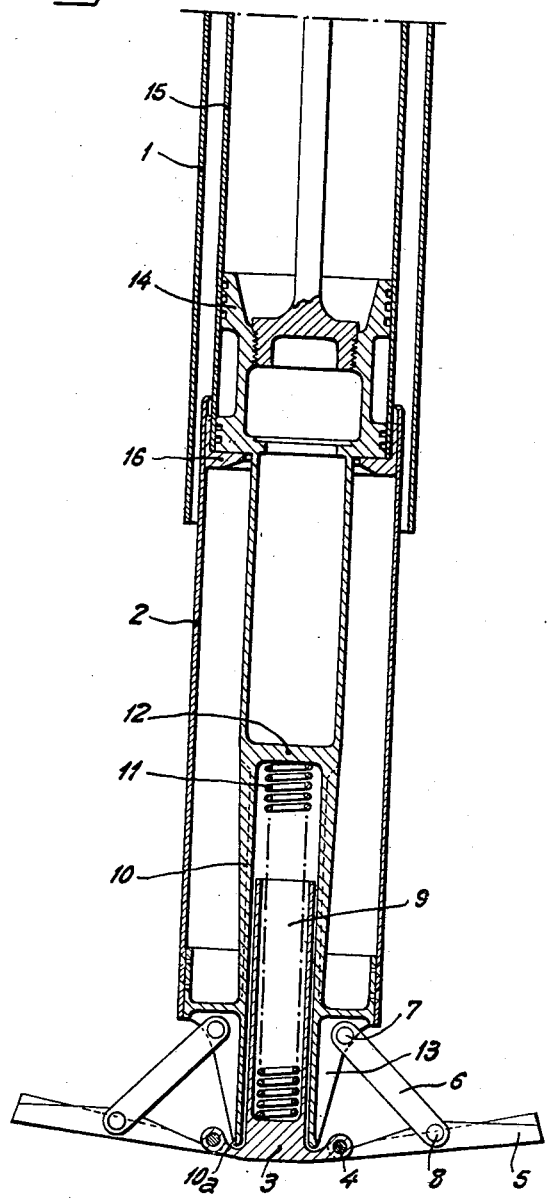

March 29, 1960
E. HABERKORN
2,930,551
LANDING DEVICE PARTICULARLY INTENDED FOR AIRCRAFT
WHICH TAKE-OFF AND LAND VERTICALLY
Filed Sept. 18, 1956
3 Sheets-Sheet 3
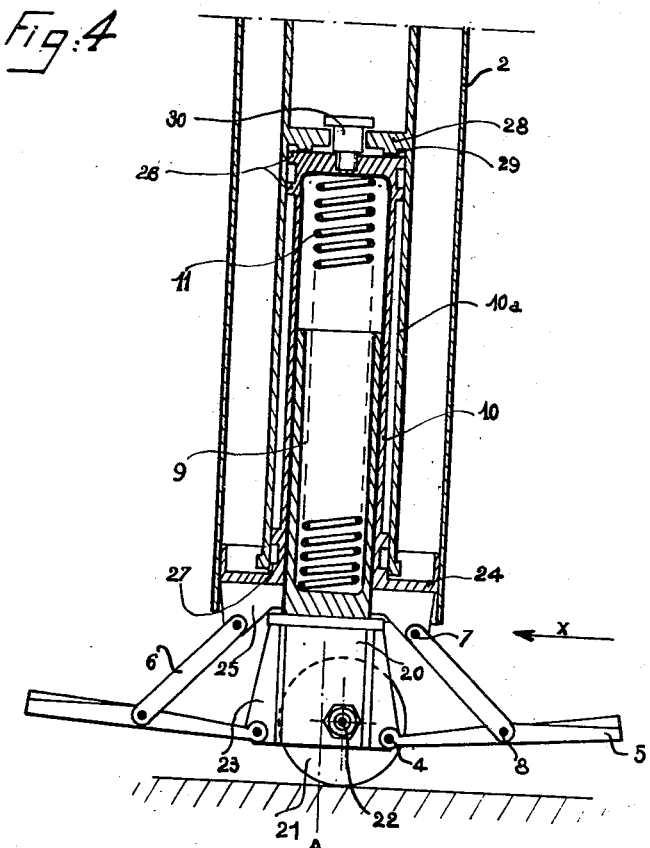
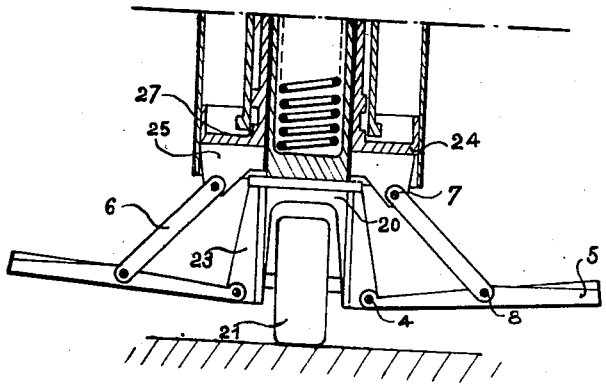
INVENTOR
ERICH HABERKORN
By
Watson, Cole, Grindle & Watson
ATTORNEYS

United States Patent Office 2,930,551
Patented Mar. 29, 1960

2,930,551

LANDING DEVICE PARTICULARLY INTENDED FOR AIRCRAFT WHICH TAKE-OFF AND LAND VERTICALLY

Erich Haberkorn, Dammarie-les-Lys, France, assignor to Societe Nationale d'Etude et de Construction de Moteurs d'Aviation, Paris, France, a company of France Application September 18, 1956, Serial No. 610,504

Claims priority, application France September 19, 1955

3 Claims. (Cl. 244—102)

The construction of aircraft which take-off and land vertically presents a certain number of problems amongst which should be cited the problem of supporting the aircraft on the landing ground.

A supporting device of this kind should comply with two main conditions. First of all, when the aircraft is in normal flight, the landing device, as is the case for normal types of aircraft provided with retractable landing gear, should interfere as little as possible with the aerodynamic qualities of the device, or in other words, the landing device should not increase the drag of the machine.

In addition, the surface over which the aircraft is in contact with the ground should be as large as possible in order to reduce the unit pressure applied to the ground.

The present invention satisfies these various conditions. It has for its object a landing device for aircraft which take-off and land vertically, the device comprising a number of feet arranged at the rear portion of the aircraft and each formed by a hollow cylindrical body parallel to the axis of the aircraft, in which slides a rod terminating in a base-plate combined with complementary supporting surfaces adapted to be unfolded under the effect of the thrust applied to the base-plate when the latter has come into contact with the ground.

Fig. 2 is a detailed cross-section taken along the axis of the foot shown in Fig. 1.

Fig. 4 is a view in vertical cross-section of a landing gear provided with orientatable wheels.

Fig. 5 is a partial view looking in the direction of the arrow X of Fig. 4.

Figure 1:
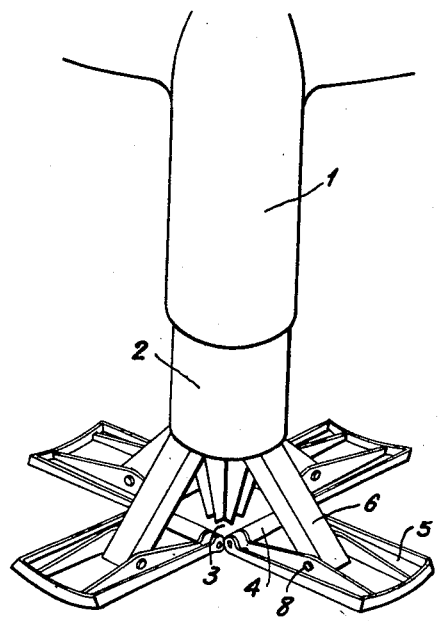
Fig. 1 is a view in perspective of a foot in the supporting position on the ground, in accordance with one form of embodiment of the invention.

In Fig. 1, there is shown diagrammatically a supporting foot for an aircraft which is adapted to land and to take-off vertically, the foot being shown in the supporting position on the landing ground. The vertical body of the foot comprises a front portion 1 and a rear portion 2 which are arranged to slide one with respect to the other. The rear portion 2 is connected by supporting members which are described later to a base-plate 3 resting on the ground.

In the example shown, this plate is of square shape and along its sides are pivotally mounted by means of hinges 4, plates or flaps 5 of rectangular shape. These flaps are coupled to the rear part 2 of the foot by crank-arms 6 pivoted to the part 2 at 7 (see Fig. 2) and to the various flaps at 8.

Fig. 2 shows the details of the mounting of the base-plate, of the flaps and of their pivotal arms. The base-plate 3 is carried by an axial cylindrical rod 9 which can slide inside a socket 10 rigidly fixed to the rear part 2 of the foot. An elastic member such as a spring 11 is compressed between the base-plate and a wall 12 which closes the upper extremity of the socket 10. The displacement of the base-plate towards the front is limited by coming into abutment with the rear projecting portion 10a of the socket 10. This projecting part of the socket 10 is reinforced by longitudinal ribs such as 13 which face the flaps. The pivotal spindles 7 of the crank-arms 6 are mounted by passing through these ribs. The pivotal spindles 7 and 4 corresponding are arranged two by two in planes parallel to the axis of the device.

The lower part 2 of the body of the foot which slides in the upper part 1 is rigidly fixed to a piston 14 adapted to slide inside a cylinder 15 which is rigidly secured to the part 1. The part 2 is slidable on this cylinder 15, and a fluid-tight joint is provided at 16 on the extremity of the cylinder 15, the assembly forming part of an oleo-pneumatic shock-absorber of known type, which it is not necessary to describe in more detail, since any arrangement of cylindrical shock-absorber with a long travel is suitable.

Figure 3:
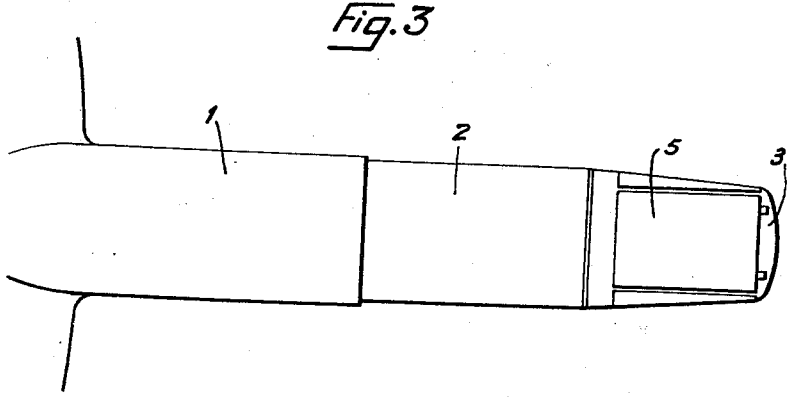
Fig. 3 is a diagrammatic view of a foot in position during flight.

Fig. 3 shows a foot of an aircraft in position of horizontal flight, the flaps such as 5 being folded back by the action of the spring 11 about the rear part of the foot in such manner that the assembly has only a small aerodynamic drag.

The operation of the device is as follows:

When the apparatus carries out a landing operation vertically for example, it makes contact with the ground through one or a number of base-plates such as 3, the rod 9 of which slides inside the socket 10, as long as the whole unit of the aircraft continues its downward movement. The spring 11 brakes this movement until the moment when the base-plate comes into abutment with the projecting edge of the socket 10. This relative movement of the plate 3 and of the socket 10 has the effect of bringing closer together the pivot spindles 7 and 4. For this reason, the crank-arms 6 cause the flaps 5 to open outwards. The dimensions of the crank-arms 6 are such that in the abutment position of the base-plate against the edge 10a, the flaps are roughly horizontal and, more exactly, slightly above the horizontal in order to prevent the aircraft resting in certain cases on the extremities of the flaps.

In addition to the damping of the shocks produced by the spring 11, the oleo-pneumatic shock-absorber system with a long travel, comprising the piston 14 and the sliding joint 16, or any other equivalent system, forms a suspension which protects the aircraft against violent shocks.

At the moment of taking-off, when the base-plate leaves the ground, the spring 11 is extended to its maximum and the flaps 5 are automatically folded back to form an extension of the rear part of the foot. For this reason, the flaps are never likely to brake the taking-off of the device.

In Figs. 4 and 5, the upper part of the oleo-pneumatic shock-absorber has not been shown, since the shock-absorber described above or any other shock-absorbing system may be employed. The members which have been previously employed and described above have been given the same reference numbers.

The cylindrical rod 9 slides inside a cylinder 10 and carries at its base a fork 20, between the arms of which a wheel 21 is free to rotate about its axis 22, the latter being displaced with respect to the general axis A of the landing leg. The fork 20 is provided with ribs 23 which give it added rigidity and are adapted to receive the pivot spindles 4 of the flaps 5. In both these figures, the fork 20 has not been shown in cross-section and the flap located on the side from which the member is viewed has not been drawn-in for the sake of clearness of the drawing. The base 24 of the cylinder 10 carries the lugs 25 which receive the pivotal axes 7 of the crank-arm 6 and can turn freely inside the outer casing 2.

The cylinder 10 can pivot inside the cylinder 10a which is rigidly fixed to the landing gear, on the circular bearings 26 and 27 which take up the stresses in the horizontal plane. A diaphragm 28 carrying a circular abutment 29 transmits the vertical stresses when the apparatus is on the ground. A screw 30 provided with a shoulder having a length sufficient to leave a small clearance between its head and the diaphragm 28, maintains the cylinder 10 in position whilst permitting it to rotate. The unit comprising the cylinder 10, the cylindrical rod 9, the wheel 21 and the flaps 5 with their folding device can thus pivot inside the cylinder 2 in accordance with the direction in which the wheel 21 is urged.

When the aircraft carries out a vertical landing, it makes contact with the ground through the wheel 21 which pushes the rod 9 inwards to produce opening of the flaps 5 in the same way as has been described previously. If the landing ground is too soft, the wheel sinks in it until the flaps 5 are supported on the ground.

During flight, when the flaps are folded back, only a small part of the wheel projects beyond the landing gear towards the rear, and does not increase the drag to any appreciable extent. An arrangement may also be provided however to fair-off the wheel when the flaps are folded back.

The addition of these wheels completes the device with advantage, by making the aircraft equipped with them independent of the services of air-field trucks or trolleys.

It will of course be understood that modifications may be made to the forms of embodiment which have been described above, in particular by the substitution of equivalent technical means, without thereby departing from the spirit or from the scope of the present invention.

What I claim is:

1. A landing gear for a vertical take-off and landing aircraft, comprising a plurality of telescopic pods extending substantially parallel to each other beyond the rearwardmost extremity of said aircraft and terminating in a common plane transverse to the longitudinal axis of said aircraft, each pod comprising a stationary upper tubular part fast with the aircraft structure, a movable lower tubular part coaxial with and slidable relatively to said upper part, a coaxial cylindrical housing fast with and extending inside said lower part, said housing having a closed upper end and an open lower end, a slidable tube partly accommodated in said housing, partly projecting rearwardly therefrom and having a lower closed end and an upper open end, a coil spring housed partly in said cylindrical housing and partly in said tube, said spring applying against the closed ends of said housing and said tube whereby it acts on said tube for urging it towards the rear of and outside the cylindrical housing, a base plate fast with said tube at the bottom thereof and having a substantially flat surface transverse to the longitudinal axis of said aircraft, said surface coming into contact with the ground, a plurality of pivots fast with said base plate, said pivots forming substantially the sides of a polygon and being disposed above said flat surface whereby said pivots do not come into contact with the ground, a plurality of pads pivoted on said base plate and radiating therefrom, and a hinged linkage between each pad and a point of said lower part.

2. Landing gear as claimed in claim 1, wherein the base plate is generally of square shape, the pads being generally of rectangular shape and being pivoted about the four sides of the square plate, whereby the plate and pads form a substantially planar cruciform support surface.

3. Landing gear as claimed in claim 1, wherein each linkage is constituted by a single rigid member hinged at one end thereof to a pad and at the other end thereof to the lateral external wall of said lower part.

References Cited in the file of this patent

UNITED STATES PATENTS

| 2,387,762 | Leonard | Oct. 30, 1945 |
| 2,578,578 | Myers | Dec. 11, 1951 |
| 2,750,133 | Lebold | June 12, 1956 |

FOREIGN PATENTS

| 1,118,754 | France | Mar. 26, 1956 |